(12) United States Patent
Yamakage et al.

(10) Patent No.: US 11,670,983 B2
(45) Date of Patent: Jun. 6, 2023

(54) MOTOR-DRIVEN COMPRESSOR

(71) Applicant: KABUSHIKI KAISHA TOYOTA JIDOSHOKKI, Kariya (JP)

(72) Inventors: Shumpei Yamakage, Kariya (JP); Yusuke Kinoshita, Kariya (JP); Koki Shinohara, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 72 days.

(21) Appl. No.: 17/205,257

(22) Filed: Mar. 18, 2021

(65) Prior Publication Data
US 2021/0305871 A1 Sep. 30, 2021

(30) Foreign Application Priority Data
Mar. 31, 2020 (JP) .............................. JP2020-064650

(51) Int. Cl.
*H02K 3/50* (2006.01)
*H02K 5/22* (2006.01)
(Continued)

(52) U.S. Cl.
CPC ............... *H02K 5/225* (2013.01); *H02K 3/50* (2013.01); *H02K 11/33* (2016.01); *B60H 1/3222* (2013.01);
(Continued)

(58) Field of Classification Search
CPC ........ H02K 11/33; H02K 5/225; H02K 3/345; H02K 5/22; H02K 3/50; H02K 3/52; H02K 2211/03; H02K 2203/06; H02K 2203/09; F04D 29/668; F04D 25/0693; F04B 39/00; F04B 35/04; F04B 49/06; F04B 39/121;
(Continued)

(56) References Cited

U.S. PATENT DOCUMENTS

2003/0200761 A1* 10/2003 Funahashi ........... F04C 29/0085
62/228.4
2010/0181850 A1 7/2010 Ichise et al.
(Continued)

FOREIGN PATENT DOCUMENTS

JP 2005-36773 A 2/2005
JP 2011-15586 A 1/2011
(Continued)

*Primary Examiner* — Alexander A Singh
(74) *Attorney, Agent, or Firm* — Sughrue Mion, PLLC (57) ABSTRACT

A motor-driven compressor includes a compression unit, an electric motor, a motor controller, a housing, and a connector. The motor controller includes a circuit board. The housing includes an inverter accommodation chamber, and the inverter accommodation chamber accommodates the motor controller. The connector is accommodated in the inverter accommodation chamber and electrically connects the circuit board and a member located outside the inverter accommodation chamber. The connector includes one or more busbars and a case. The one or more busbars are electrically connected to the circuit board. The case is formed from a resin and accommodates the one or more
(Continued)

busbars. The circuit board and the connector are fastened to the housing. The one or more busbars are allowed to move in the case when the circuit board vibrates.

9 Claims, 4 Drawing Sheets

(51) Int. Cl.
*H02K 11/33* (2016.01)
*B60H 1/32* (2006.01)

(52) U.S. Cl.
CPC .. *B60H 2001/3292* (2013.01); *H02K 2203/06* (2013.01); *H02K 2203/09* (2013.01); *H02K 2211/03* (2013.01)

(58) Field of Classification Search
CPC .......... B60H 1/3222; B60H 2001/3292; F04C 2240/803; F04C 2240/808
USPC ........................................................... 310/71
See application file for complete search history.

(56) References Cited

U.S. PATENT DOCUMENTS

| | | | |
|---|---|---|---|
| 2011/0175470 | A1 | 7/2011 | Kinoshita et al. |
| 2011/0316373 | A1* | 12/2011 | Kobayashi ............. H02K 11/33 |
| | | | 310/71 |
| 2012/0063188 | A1 | 3/2012 | Hotta et al. |
| 2014/0377097 | A1 | 12/2014 | Yano et al. |
| 2015/0056086 | A1 | 2/2015 | Yano et al. |
| 2016/0013701 | A1* | 1/2016 | Suitou ..................... H02K 5/24 |
| | | | 310/43 |
| 2018/0091016 | A1* | 3/2018 | Fujii ........................ H02K 5/04 |
| 2020/0336037 | A1* | 10/2020 | Naitou ..................... H02K 3/50 |

FOREIGN PATENT DOCUMENTS

| | | |
|---|---|---|
| JP | 2011-144788 A | 7/2011 |
| JP | 2015-040538 A | 3/2015 |
| JP | 2018-053825 A | 4/2018 |
| KR | 10-2015-0000838 A | 1/2015 |
| KR | 10-2018-0111594 A | 10/2018 |
| WO | 2009/066569 A1 | 5/2009 |

* cited by examiner

MOTOR-DRIVEN COMPRESSOR

BACKGROUND

1. Field

The following description relates to a motor-driven compressor.

2. Description of Related Art

A typical motor-driven compressor includes a compression unit that compresses a fluid, an electric motor that drives the compression unit, a motor controller that includes a circuit board, and a housing that includes an inverter accommodation chamber. The motor controller is accommodated in the inverter accommodation chamber and is configured to drive the electric motor. Further, Japanese Laid-Open Patent Publication No. 2015-40538 discloses an example of a motor-driven compressor that includes a connector accommodated in an inverter accommodation chamber. The connector connects a circuit board and a member located outside the inverter accommodation chamber. The connector includes a busbar and a resin case. The busbar is electrically connected to the circuit board. The case accommodates the busbar. The busbar is, for example, insert-molded and modularized with the case. Further, the busbar is, for example, soldered to the circuit board.

SUMMARY

With such a motor-driven compressor, when the motor-driven compressor vibrates, the circuit board will move relative to the connector. This may apply stress to the busbar that bends the busbar or damages the connection part, such as the solder, connecting the busbar and the circuit board.

One objective of the present disclosure is to provide a motor-driven compressor that has superior vibration resistance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit, an electric motor, a motor controller, a housing, and a connector. The compression unit is configured to compress a fluid. The electric motor is configured to drive the compression unit. The motor controller includes a circuit board and is configured to drive the electric motor. The housing includes an inverter accommodation chamber, and the inverter accommodation chamber accommodates the motor controller. The connector is accommodated in the inverter accommodation chamber and electrically connects the circuit board and a member located outside the inverter accommodation chamber. The connector includes one or more busbars and a case. The one or more busbars are electrically connected to the circuit board. The case is formed from a resin and accommodates the one or more busbars. The circuit board and the connector are fastened to the housing. The one or more busbars are allowed to move in the case when the circuit board vibrates.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 10 in accordance with an embodiment will now be described with reference to FIGS. 1 to 6. The motor-driven compressor 10 in the present embodiment is for use with, for example, a vehicle air conditioner.

Figure 1:
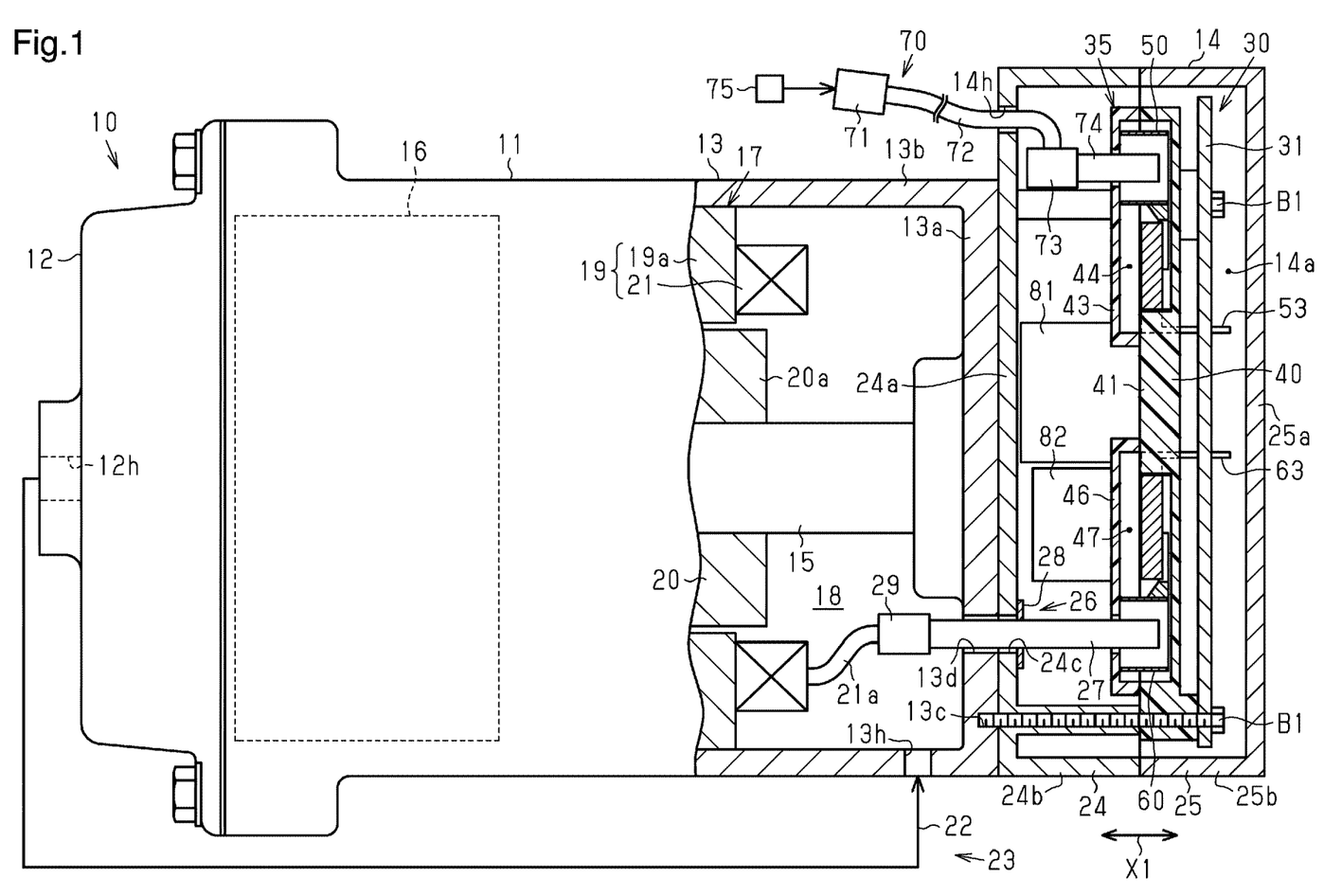
FIG. 1 is a partially cross-sectional side view showing a motor-driven compressor in accordance with an embodiment.

As shown in FIG. 1, the motor-driven compressor 10 includes a housing 11. The housing 11 includes a discharge housing member 12, a motor housing member 13, and an inverter case 14. The discharge housing member 12 includes a circumferential wall. The motor housing member 13 is coupled to the discharge housing member 12. The inverter case 14 is coupled to the motor housing member 13. The discharge housing member 12, the motor housing member 13, and the inverter case 14 are formed from a metal material, for example, aluminum. The motor housing member 13 includes an end wall 13a and a circumferential wall 13b that extends from the circumference of the end wall 13a.

The motor housing member 13 accommodates a rotation shaft 15. Further, the motor housing member 13 accommodates a compression unit 16 and an electric motor 17. The compression unit 16 compresses refrigerant that is a fluid. The electric motor 17 drives the compression unit 16. More specifically, when the electric motor 17 is driven, the rotation shaft 15 is rotated, and the rotation of the rotation shaft 15 drives the compression unit 16. The compression unit 16 and the electric motor 17 are arranged next to each other in an axial direction in which the rotation axis of the rotation shaft 15 extends. The electric motor 17 is located between the compression unit 16 and the end wall 13a. A motor chamber 18 is defined in the motor housing member 13 between the compression unit 16 and the end wall 13a to accommodate the electric motor 17.

The compression unit 16 is, for example, of a fixed scroll type, and includes a fixed scroll and a movable scroll. The fixed scroll (not shown) is fixed to the motor housing member 13, and the movable scroll (not shown) is interleaved with the fixed scroll.

The electric motor 17 includes a tubular stator 19 and a rotor 20 that is located inward from the stator 19. The rotor 20 is rotated integrally with the rotation shaft 15. The stator 19 surrounds the rotor 20. The rotor 20 includes a rotor core 20a and a plurality of permanent magnets (not shown). The rotor core 20a is fixed to the rotation shaft 15. The permanent magnets are arranged on the rotor core 20a. The stator 19 includes a tubular stator core 19a and a motor coil 21 that is wound around the stator core 19a.

The circumferential wall 13b includes a suction port 13h. The suction port 13h is connected to a first end of an external refrigerant circuit 22. The discharge housing member 12 includes a discharge port 12h. The discharge port 12h is connected to a second end of the external refrigerant circuit 22. The suction port 13h opens in the circumferential wall 13b close to the end wall 13a. The suction port 13h is connected to the motor chamber 18.

Refrigerant is drawn from the external refrigerant circuit 22 through the suction port 13h into the motor chamber 18. The compression unit 16 is driven to compress the refrigerant and discharge the refrigerant out of the discharge port 12h to the external refrigerant circuit 22. Then, the refrigerant flows through the external refrigerant circuit 22 via a heat exchanger and an expansion valve of the external refrigerant circuit 22 and returns to the motor chamber 18 through the suction port 13h. A vehicle air conditioner 23 includes the motor-driven compressor 10 and the external refrigerant circuit 22.

The inverter case 14 is coupled to the end wall 13a of the motor housing member 13. An inverter accommodation chamber 14a is defined in the inverter case 14 to accommodate a motor controller 30. Accordingly, the housing 11 includes the inverter accommodation chamber 14a accommodating the motor controller 30. The compression unit 16, the electric motor 17, and the motor controller 30 are arranged next to one another in order along the rotation axis.

Figure 2:
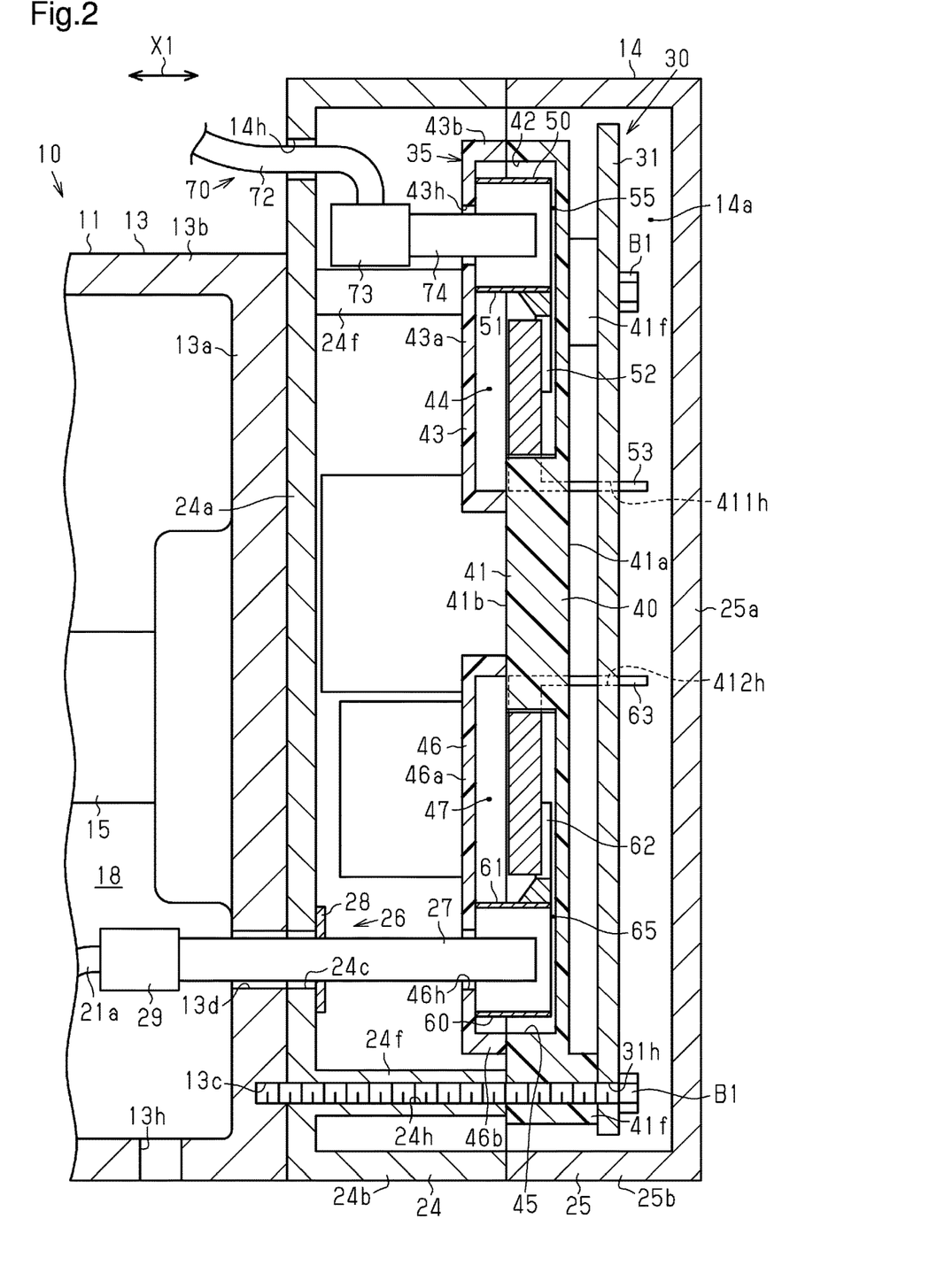
FIG. 2 is an enlarged cross-sectional view showing an inverter case.

As shown in FIG. 2, the inverter case 14 includes a case body 24 and a cover member 25. The case body 24 includes an opening, and the cover member 25 closes the opening. The case body 24 includes a case end wall 24a and a case circumferential wall 24b. The case end wall 24a is disc-shaped, and the case circumferential wall 24b extends from the circumference of the case end wall 24a. The cover member 25 includes a cover end wall 25a and a cover circumferential wall 25b. The cover end wall 25a is disc-shaped, and the cover circumferential wall 25b extends from the circumference of the cover end wall 25a.

The accommodation chamber 14a is defined by the case body 24 and the cover member 25 when the open end surface of the case circumferential wall 24b is in contact with the open end surface of the cover circumferential wall 25b. The inverter case 14 is coupled to the motor housing member 13 with the outer surface of the case end wall 24a in contact with the outer surface of the end wall 13a.

The case end wall 24a has a larger outer surface area than the end wall 13a. Thus, the case end wall 24a partially extends outward from the end wall 13a. The case end wall 24a includes a harness hole 14h in the part extending outward from the end wall 13a. The harness hole 14h extends through the case end wall 24a.

The case end wall 24a includes an inner surface and multiple case bosses 24f extend from the inner surface along the rotation axis. Further, the case body 24 includes multiple bolt holes 24h. Each of the bolt holes 24h extends through the corresponding case boss 24f. The bolt holes 24h open in the outer surface of the case end wall 24a. Further, the end wall 13a includes multiple internal thread holes 13c and each internal thread hole 13c is connected to the corresponding bolt hole 24h.

A hole 13d extends through the end wall 13a. A hole 24c extends through the case end wall 24a. The holes 13d and 24c are connected to each other.

A terminal pin 26 is coupled to the case end wall 24a. The terminal pin 26 includes three cylindrical conductive members 27 and a support plate 28. Only one conductive member 27 is shown in FIGS. 1 and 2. The support plate 28 is attached to the inner surface of the case end wall 24a to close the hole 24c.

The three conductive members 27 are supported on the case end wall 24a by the support plate 28 in a state extending through the holes 13d and 24c. Therefore, each conductive member 27 includes a first end that projects into the motor chamber 18 and a second end that projects into the inverter accommodation chamber 14a. The conductive members 27 extend through the housing 11. The motor chamber 18 accommodates a cluster block 29. Further, three motor wires 21a are drawn from the motor coil 21. The cluster block 29 electrically connects the three conductive members 27 to the three motor wires 21a, respectively.

The motor controller 30 includes a circuit board 31 to drive the electric motor 17. The circuit board 31 is accommodated in the inverter accommodation chamber 14a. Further, the motor-driven compressor 10 includes a connector 35 accommodated in the inverter accommodation chamber 14a. The connector 35 includes one or more busbars and a resin case 40. The busbars are electrically connected to the circuit board 31. The electric motor 17, the case 40, and the circuit board 31 are arranged next to one another in order along the rotation axis of the electric motor 17. The one or more busbars include two input busbars 50 and three output busbars 60, and the busbars 50 and 60 are accommodated in the case 40. Only one input busbar 50 and only one output busbar 60 are shown in FIGS. 1 and 2. Further, the case 40 holds electronic components 81 and 82. The electronic components 81 and 82 are, for example, coils, capacitors that are filter elements, or power modules in which a switching element is modularized.

The case 40 includes a case body 41 that is plate-like. The case body 41 includes multiple tubular case bosses 41f. The axial direction of each case boss 41f corresponds to the thickness-wise direction of the case body 41. The case body 41 includes a first body surface 41a and a second body surface 41b. The first body surface 41a extends in a direction intersecting the axial direction, and the second body surface 41b is located opposite the first body surface 41a. The case bosses 41f project from the first body surface 41a. The case 40 is disposed in the inverter accommodation chamber 14a so that the second body surface 41b contacts distal ends of the case bosses 24f. The inside of each case boss 41f is connected to the corresponding bolt hole 24h.

The circuit board 31 includes multiple bolt holes 31h. Each bolt hole 31h is connected to the inside of the corresponding case boss 41f. The circuit board 31 is in contact with distal ends of the case bosses 41f. Bolts B1 are inserted through the bolt holes 31h, the case bosses 41f, and the bolt holes 24*h* and fastened to the internal thread holes 13*c*. This fastens the circuit board 31 and the connector 35 to the motor housing member 13.

The case 40 is overlapped with the circuit board 31 in the inverter accommodation chamber 14*a*. In the description hereafter, the direction in which the circuit board 31 is overlapped with the case 40 will be referred to as an overlapping direction X1 of the circuit board 31 and the case 40. The overlapping direction X1 coincides with the axial direction of the rotation shaft 15 and the thickness-wise direction of the circuit board 31. The circuit board 31 is spaced apart from the first body surface 41*a* by distance corresponding to the projection amount of the case bosses 41*f* from the first body surface 41*a*.

Figure 3:
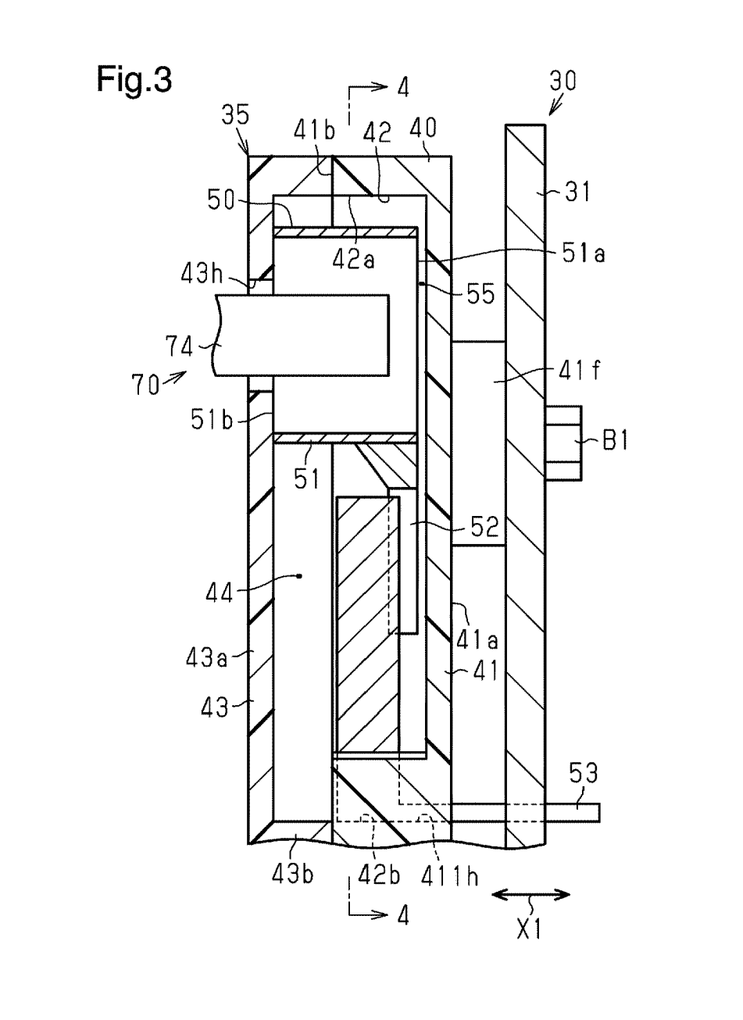
FIG. 3 is an enlarged cross-sectional view showing an input busbar accommodation portion.
Figure 4:
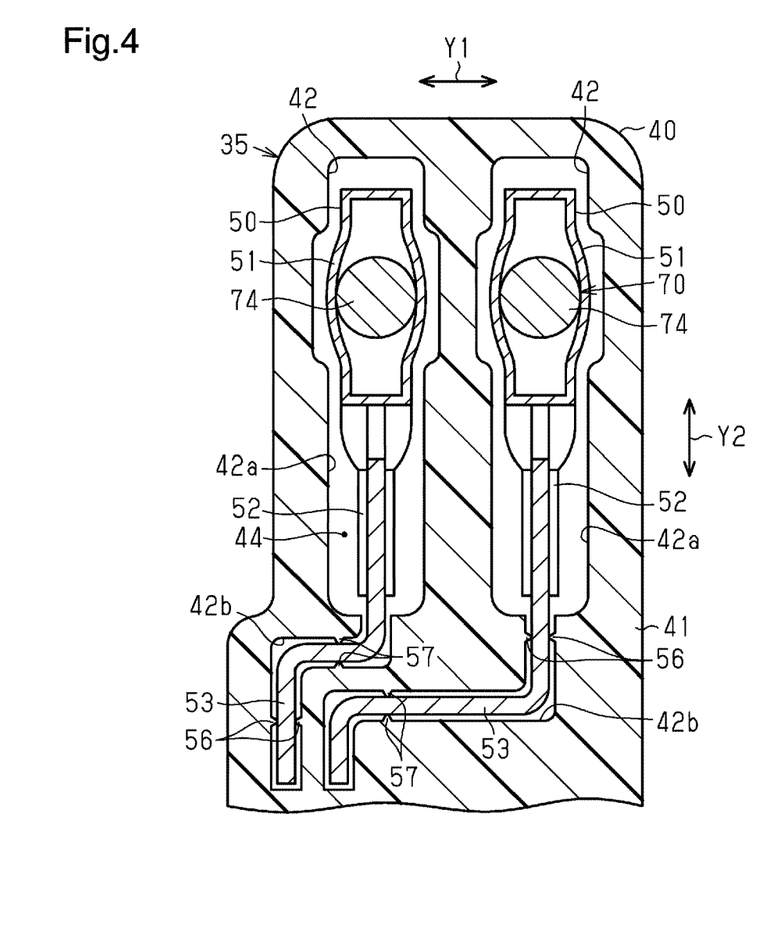
FIG. 4 is a cross-sectional view taken along line 4-4 in FIG. 3.

As shown in FIGS. 3 and 4, the case body 41 includes two input busbar accommodation recesses 42 in the second body surface 41*b*. As shown in FIG. 4, in plan view, each accommodation recess 42 includes a substantially rectangular main recess 42*a* and a strip-shaped sub-recess 42*b*. The two main recesses 42*a* extend in the same longitudinal direction and transverse direction. The transverse direction is orthogonal to the longitudinal direction. The two accommodation recesses 42 are arranged next to each other in the transverse direction of the main recesses 42*a*.

Each sub-recess 42*b* is connected to the corresponding main recess 42*a*. More specifically, each sub-recess 42*b* includes a proximal end that is connected to a first longitudinal end of the corresponding main recess 42*a*. Each sub-recess 42*b* bends in a crank-shaped manner in plan view. More specifically, each sub-recess 42*b* includes a first extension portion, a bend portion, and a second extension portion. The first extension portion extends from the corresponding main recess 42*a* in the longitudinal direction of the main recess 42*a*. The bend portion is bent from the first extension portion in the transverse direction of the main recess 42*a*. The second extension portion extends from the bend portion in the longitudinal direction of the main recess 42*a*.

As shown in FIG. 3, the case 40 includes an input busbar cover 43 that closes the openings of the two input busbar accommodation recesses 42. The cover 43 includes a cover end wall 43*a* and a cover peripheral wall 43*b*. The cover end wall 43*a* is plate-like, and the cover peripheral wall 43*b* extends from the periphery of the cover end wall 43*a*.

The cover 43 is coupled to the case body 41 so that the distal end of the cover peripheral wall 43*b* is in contact with the second body surface 41*b*. The accommodation recesses 42 and the cover 43 define an input busbar accommodation portion 44 that accommodates the input busbars 50. In other words, the case 40 includes the input busbar accommodation portion 44 that accommodates the input busbars 50.

The cover end wall 43*a* includes an inner surface opposed toward the bottom surfaces of the input busbar accommodation recesses 42. The cover end wall 43*a* includes two terminal holes 43*h* that are respectively connected with the two main recesses 42*a*. The terminal holes 43*h* extend through the cover end wall 43*a* in the thickness-wise direction. The input busbar accommodation portion 44 is defined by the bottom surfaces of the accommodation recesses 42, the inner peripheral surfaces of the accommodation recesses 42, the inner surface of the cover end wall 43*a*, and the inner peripheral surface of the cover peripheral wall 43*b*. In other words, the bottom surfaces of the accommodation recesses 42, the inner peripheral surfaces of the accommodation recesses 42, the inner surface of the cover end wall 43*a*, and the inner peripheral surface of the cover peripheral wall 43*b* are the inner surfaces of the case 40 that define the input busbar accommodation portion 44.

As shown in FIGS. 3 and 4, each input busbar 50 includes a connection terminal 51, a busbar coupling portion 52, and a lead wire 53. The connection terminal 51 is rectangular. The busbar coupling portion 52 extends from the connection terminal 51. The lead wire 53 is coupled to the busbar coupling portion 52. The connection terminal 51 is formed integrally with the busbar coupling portion 52. The busbar coupling portion 52 is, for example, welded to and joined with the basal end of the lead wire 53. The connection terminal 51 and the busbar coupling portion 52 are disposed in the corresponding main recess 42*a*. The lead wire 53 extends from the main recess 42*a* into the sub-recess 42*b*. The lead wire 53 bends in a crank-shaped manner in conformance with the sub-recess 42*b*.

The case body 41 includes two lead holes 411*h* that are respectively connected to the two sub-recesses 42*b*. Each lead hole 411*h* extends through the case body 41 in the thickness-wise direction. The lead hole 411*h* opens in the first body surface 41*a*. Further, each lead wire 53 extends through the corresponding lead hole 411*h* and projects toward the circuit board 31. The distal end of the lead wire 53 is soldered to the circuit board 31. In other words, part of each input busbar 50 projects out of the input busbar accommodation portion 44 toward the circuit board 31 and is soldered to the circuit board 31. More specifically, each lead wire 53 includes an extension portion, a bend portion, and a projection portion. The extension portion extends from the corresponding busbar coupling portion 52 in conformance with the corresponding main recess 42*a* in a direction intersecting the rotation axis. The bend portion is bent from the extension portion in conformance with the corresponding sub-recess 42*b*. The projection portion extends out of the case 40 and includes a distal end that is connected to the circuit board 31.

As shown in FIG. 3, each connection terminal 51 includes a first end 51*a* and a second end 51*b* in the axial direction. The first end 51*a* is opposed toward the bottom surface of the corresponding accommodation recess 42 in the overlapping direction X1. The second end 51*b* is opposed toward the inner surface of the cover end wall 43*a* in the overlapping direction X1. When the first end 51*a* is in contact with the bottom surface of the accommodation recess 42, the second end 51*b* is separated from the inner surface of the cover end wall 43*a*. When the second end 51*b* is in contact with the inner surface of the cover end wall 43*a*, the first end 51*a* is separated from the bottom surface of the accommodation recess 42. Therefore, a gap 55 is formed between each input busbar 50 and the inner surface of the case 40 to allow the circuit board 31 and the input busbars 50 to move relative to the case 40 in the overlapping direction X1. The gap 55 allows the input busbars 50 to move in the case 40 when the circuit board 31 vibrates.

As shown in FIG. 4, the case 40 includes two pairs of first projections 56 and two pairs of second projections 57. More specifically, each sub-recess 42*b* includes one pair of the first projections 56 arranged in the first extension portion or the second extension portion, which extends in the longitudinal direction, and one pair of the second projections 57 arranged in the bend portion.

The two paired first projections 56 project toward each other from two opposing inner side surfaces of the sub-recess 42*b*. Each pair of the first projections 56 sandwiches the corresponding lead wire 53 at a part extending in the longitudinal direction of the main recess 42*a*. This restricts movement of the lead wire 53 relative to the case 40 in a first intersecting direction Y1. The first intersecting direction Y1 is orthogonal to the overlapping direction X1 and coincides with the transverse direction of the main recess 42a.

The two paired second projections 57 project toward each other from two opposing inner side surfaces of the sub-recess 42b. Each pair of the second projections 57 sandwiches the corresponding lead wire 53 at a part extending in the transverse direction of the main recess 42a. This restricts movement of the lead wire 53 relative to the case 40 in a second intersecting direction Y2. The second intersecting direction Y2 is orthogonal to both the overlapping direction X1 and the first intersecting direction Y1 and coincides with the longitudinal direction of the main recess 42a.

Therefore, one pair of the first projections 56 and one pair of the second projections 57 are used as restrictors that restrict movement of the corresponding input busbar 50 relative to the case 40 in a direction (overlapping direction X1) intersecting the thickness-wise direction of the circuit board 31.

As shown in FIGS. 1 and 2, the motor-driven compressor 10 includes a high-voltage electric wire 70. The high-voltage electric wire 70 includes a high-voltage connector 71, a high-voltage harness 72, a high-voltage connection terminal 73, and two high-voltage connection pins 74. The high-voltage connection terminal 73 is located in the inverter accommodation chamber 14a. Each high-voltage connection pin 74 includes a first end and a second end. The first end of the high-voltage connection pin 74 is electrically connected to the high-voltage connection terminal 73. The second end of the high-voltage connection pin 74 can be fitted to and removed from the connection terminal 51 of the corresponding input busbar 50 through the corresponding terminal hole 43h of the cover end wall 43a. When the second end of the high-voltage connection pin 74 is inserted through the terminal hole 43h and fitted to the connection terminal 51, the high-voltage electric wire 70 is electrically connected to the corresponding input busbar 50.

The high-voltage harness 72 includes a first end and a second end. The first end of the high-voltage harness 72 is electrically connected to the high-voltage connection terminal 73. The high-voltage harness 72 extends through the harness hole 14h, and the second end of the high-voltage harness 72 extends out of the inverter case 14. The high-voltage connector 71 is electrically connected the second end of the high-voltage harness 72. The high-voltage connector 71 is electrically connected to an external power supply 75. Further, the external power supply 75 is electrically connected to the circuit board 31 via the high-voltage connector 71, the high-voltage harness 72, the high-voltage connection terminal 73, the high-voltage connection pins 74, and the input busbars 50. Therefore, the input busbars 50 are used to electrically connect the external power supply 75 and the circuit board 31. The high-voltage electric wire 70 includes a first end that is electrically connected to the corresponding input busbar 50 and a second end that is electrically connected to the external power supply 75. The high-voltage electric wire 70 extends out of the housing 11. Therefore, the connector 35 electrically connects the circuit board 31 and the external power supply 75, which is located outside the inverter accommodation chamber 14a.

Figure 5:
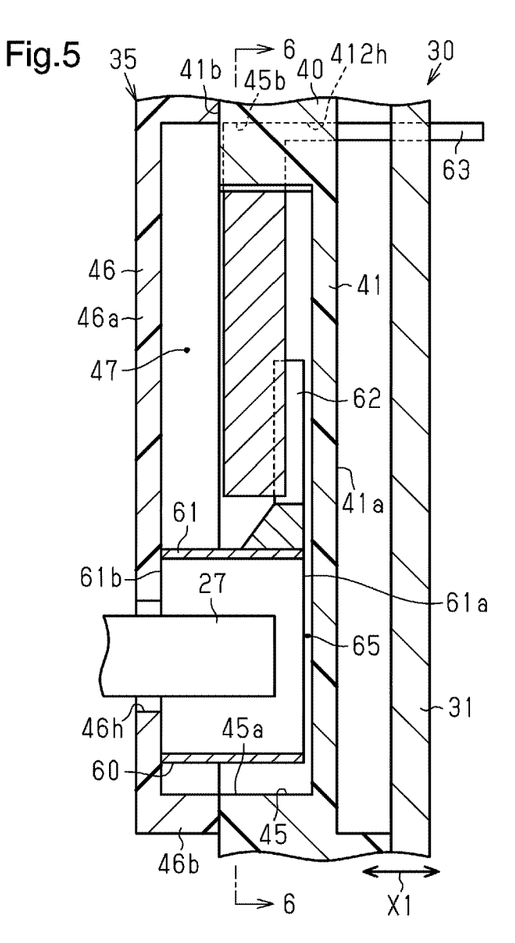
FIG. 5 is an enlarged cross-sectional view showing an output busbar accommodation portion.
Figure 6:
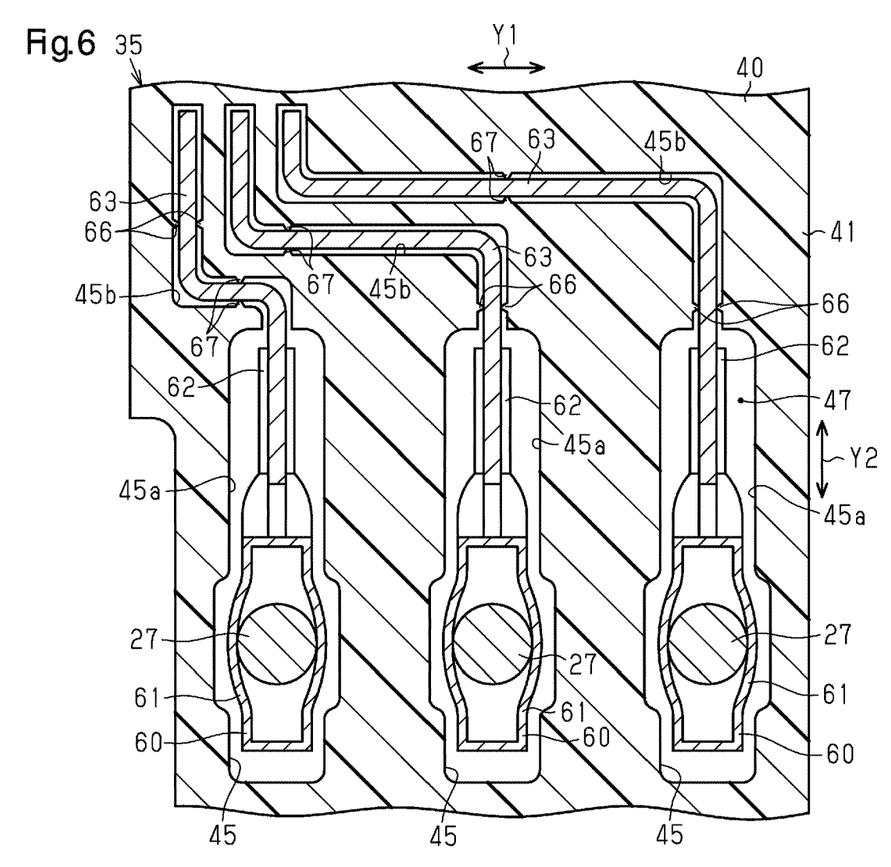
FIG. 6 is a cross-sectional view taken along line 6-6 in FIG. 5.

As shown in FIGS. 5 and 6, the case body 41 includes three output busbar accommodation recesses 45 in the second body surface 41b. As shown in FIG. 6, in plan view, each accommodation recess 45 includes a substantially rectangular main recess 45a and a strip-shaped sub-recess 45b. The three main recesses 45a extend in the same longitudinal direction and transverse direction. The transverse direction is orthogonal to the longitudinal direction. The three accommodation recesses 45 are arranged next to one another in the transverse direction of the main recesses 45a.

Each sub-recess 45b is connected to the corresponding main recess 45a. More specifically, each sub-recess 45b includes a proximal end that is connected with a first longitudinal end of the corresponding main recess 45a. Each sub-recess 45b bends in a crank-shaped manner in plan view. More specifically, each sub-recess 45b includes a first extension portion, a bend portion, and a second extension portion. The first extension portion extends from the corresponding main recess 45a in the longitudinal direction of the main recess 45a. The bend portion extends from the first extension portion in the transverse direction of the main recess 45a. The second extension portion extends from the bend portion in the longitudinal direction of the main recess 45a.

As shown in FIG. 5, the case 40 includes an output busbar cover 46 that closes the openings of the three output busbar accommodation recesses 45. The cover 46 includes a cover end wall 46a and a cover peripheral wall 46b. The cover end wall 46a is plate-like, and the cover peripheral wall 46b extends from the periphery of the cover end wall 46a.

The cover 46 is coupled to the case body 41 so that the distal end of the cover peripheral wall 46b is in contact with the second body surface 41b. The accommodation recesses 45 and the cover 46 define an output busbar accommodation portion 47 that accommodates the output busbars 60. In other words, the case 40 includes the output busbar accommodation portion 47 that accommodates the output busbars 60.

The cover end wall 46a includes an inner surface opposed toward the bottom surfaces of the output busbar accommodation recesses 45. The cover end wall 46a includes three terminal holes 46h that are respectively connected to the three main recesses 45a. The terminal holes 46h extend through the cover end wall 43a in the thickness-wise direction. The output busbar accommodation portion 47 is defined by the bottom surfaces of the accommodation recesses 45, the inner peripheral surfaces of the accommodation recesses 45, the inner surface of the cover end wall 46a, and the inner peripheral surface of the cover peripheral wall 46b. In other words, the bottom surfaces of the accommodation recesses 45, the inner peripheral surfaces of the accommodation recesses 45, the inner surface of the cover end wall 46a, and the inner peripheral surface of the cover peripheral wall 46b are the inner surfaces of the case 40 that define the output busbar accommodation portion 47.

As shown in FIGS. 5 and 6, each output busbar 60 includes a connection terminal 61, a busbar coupling portion 62, and a lead wire 63. The connection terminal 61 is rectangular. The busbar coupling portion 62 extends from the connection terminal 61. The lead wire 63 is coupled to the busbar coupling portion 62. The connection terminal 61 is formed integrally with the busbar coupling portion 62. The busbar coupling portion 62 is, for example, welded to and joined with the basal end of the lead wire 63. The connection terminal 61 and the busbar coupling portion 62 are disposed in the corresponding main recess 45a. The lead wire 63 extends from the main recess 45a into the sub-recess 45b. The lead wire 63 bends in a crank-shaped manner in conformance with the sub-recess 45b.

The case body 41 includes three lead holes 412h that are respectively connected to the three sub-recesses 45b. Each lead hole 412h extends through the case body 41 in the thickness-wise direction. The lead hole 412h opens in the first body surface 41a. Further, each lead wire 63 extends through the corresponding lead hole 412h and projects toward the circuit board 31. The distal end of the lead wire 63 is soldered to the circuit board 31. In other words, part of each output busbar 60 projects out of the output busbar accommodation portion 47 toward the circuit board 31 and is soldered to the circuit board 31. More specifically, each lead wire 63 includes an extension portion, a bend portion, and a projection portion. The extension portion extends from the corresponding busbar coupling portion 62 in conformance with the corresponding main recess 45a in a direction intersecting the rotation axis. The bend portion is bent from the extension portion in conformance with the corresponding sub-recess 45b. The projection portion extends out of the case 40 and includes a distal end that is connected to the circuit board 31.

As shown in FIG. 5, each connection terminal 61 includes a first end 61a and a second end 61b in the axial direction. The first end 61a is opposed toward the bottom surface of the corresponding accommodation recess 45 in the overlapping direction X1. The second end 61b is opposed toward the inner surface of the cover end wall 46a in the overlapping direction X1. When the first end 61a is in contact with the bottom surface of the accommodation recess 45, the second end 61b is separated from the inner surface of the cover end wall 46a. When the second end 61b is in contact with the inner surface of the cover end wall 46a, the first end 61a is separated from the bottom surface of the accommodation recess 45. Therefore, a gap 65 is formed between each output busbar 60 and the inner surface of the case 40 to allow the circuit board 31 and the output busbars 60 to move relative to the case 40 in the overlapping direction X1. The gap 65 allows the output busbars 60 to move in the case 40 when the circuit board 31 vibrates.

As shown in FIG. 6, the case 40 includes three pairs of first projections 66 and three pairs of second projections 67. More specifically, each sub-recess 45b includes one pair of the first projections 66 arranged in the first extension portion or the second extension portion, which extends in the longitudinal direction, and one pair of the second projections 67 arranged in the bend portion.

The two paired second projections 66 project toward each other from two opposing inner side surfaces of the sub-recess 45b. Each pair of the first projections 66 sandwiches the corresponding lead wire 63 at a part extending in the longitudinal direction of the main recess 45a. This restricts movement of the lead wire 63 relative to the case 40 in the first intersecting direction Y1. The first intersecting direction Y1 is orthogonal to the overlapping direction X1 and coincides with the transverse direction of the main recess 45a.

The two paired second projections 67 project toward each other from two opposing inner side surfaces of the sub-recess 45b. Each pair of the second projections 67 sandwiches the corresponding lead wire 63 at a part extending in the transverse direction of the main recess 45a. This restricts movement of the lead wire 63 relative to the case 40 in the second intersecting direction Y2. The second intersecting direction Y2 is orthogonal to both the overlapping direction X1 and the first intersecting direction Y1 and coincides with the longitudinal direction of the main recess 45a.

Therefore, one pair of the first projections 66 and one pair of the second projections 67 are used as restrictors that restrict movement of the corresponding output busbar 60 relative to the case 40 in a direction (overlapping direction X1) intersecting the thickness-wise direction of the circuit board 31.

As shown in FIGS. 5 and 6, the second end of each conductive member 27 can be fitted to and removed from the corresponding connection terminal 61 through the corresponding terminal hole 46h of the cover end wall 46a. When the second end of the conductive member 27 is inserted through the terminal hole 46h and fitted into the connection terminal 61, the conductive member 27 is electrically connected to the corresponding output busbar 60.

The electric motor 17 is electrically connected to the circuit board 31 via the motor wires 21a, the cluster block 29, the conductive members 27, and the output busbars 60. Therefore, each output busbar 60 is used to electrically connect the corresponding conductive member 27 to the circuit board 31. Further, the conductive members 27 are used to electrically connect the electric motor 17 to the motor controller 30. Therefore, the connector 35 electrically connects the circuit board 31 and the electric motor 17, which is located outside the inverter accommodation chamber 14a.

The operation of the present embodiment will now be described.

The motor-driven compressor 1 may vibrate, for example, when the vehicle is traveling. When the motor-driven compressor 10 vibrates, the circuit board 31 may move relative to the connector 35. In particular, if the high-voltage electric wire 70 that is connected to the external power supply 75 extends out of the housing 11, the high-voltage electric wire 70 will also vibrate when the motor-driven compressor 10 vibrates, which will increase the vibration of the motor-driven compressor 10. This may further increase movement of the circuit board 31 relative to the connector 35 when the motor-driven compressor 10 vibrates.

In this case, the gap 55 allows the input busbars 50 and the circuit board 31 to move relative to the case 40 in the overlapping direction X1. Thus, the input busbars 50 can move in the case 40 when the circuit board 31 vibrates. The gap 65 allows the output busbars 60 and the circuit board 31 to move relative to the case 40 in the overlapping direction X1. Thus, the output busbars 60 can move in the case 40 when the circuit board 31 vibrates. In this manner, even when the circuit board 31 moves relative to the connector 35, the stress applied to the busbars 50 and 60 will be reduced. This avoids bending of the busbars 50 and 60 and damage to the connection part of the busbars 50 and 60 and the circuit board 31.

Further, the projections 56, 66, 57, and 67 restrict movement of the busbars 50 and 60 relative to the case 40 in a direction intersecting the overlapping direction X1. Accordingly, displacement of the portions where the busbars 50 and 60 are connected to the circuit board 31 is limited in a direction intersecting the overlapping direction X1. This further reduces the stress applied to the busbars 50 and 60. Therefore, bending of the busbars 50 and 60 is further limited, and damage to the connection part of the busbars 50 and 60 and the circuit board 31 is further avoided.

The above embodiment has the following advantages.

(1) The busbars 50 and 60 are allowed to move in the case 40 when the circuit board 31 is vibrated. Accordingly, even when the circuit board 31 moves relative to the connector 35, the stress applied to the busbars 50 and 60 is reduced. Thus, bending of the busbars 50 and 60 is limited, and damage to the connection part of the busbars 50 and 60 and the circuit board 31 is avoided. Therefore, the motor-driven compressor 10 has superior vibration resistance.

(2) The high-voltage electric wire 70, which is extended out of the housing 11 and connected to the external power supply 75, vibrates together with the motor-driven compressor 10, for example, when the motor-driven compressor 10 vibrates. Thus, the motor-driven compressor 10 tends to vibrate. Vibration of the motor-driven compressor 10 tends to move the circuit board 31 relative to the connector 35. Nevertheless, the input busbars 50 are allowed to move in the case 40 as the circuit board 31 vibrates. Thus, even when the circuit board 31 moves relative to the connector 35, the stress applied to the input busbars 50 is reduced. Therefore, bending of the input busbars 50 is limited, and damage to the connection part of the input busbars 50 and the circuit board 31 is avoided.

(3) The output busbars 60 are allowed to move in the case 40 when the circuit board 31 vibrates. Thus, when the case 40 accommodates the output busbars 60 that electrically connect the conductive members 27 to the circuit board 31, even if the circuit board 31 is moved relative to the connector 35, the stress applied to the output busbar 60 will be reduced. As a result, even when the case 40 accommodates the output busbars 60 that electrically connect the conductive members 27 to the circuit board 31, bending of the output busbars 60 is limited, and damage to the connection part of the output busbar 60 and the circuit board 31 is avoided.

(4) The projections 56, 66, 57, and 67 restrict movement of the busbars 50 and 60 relative to the case 40 in a direction intersecting the thickness-wise direction of the circuit board 31. This restricts movement of the portions where the busbars 50 and 60 are connected to the circuit board 31 in a direction intersecting the thickness-wise direction of the circuit board 31. Therefore, the stress applied to the busbars 50 and 60 is further reduced.

(5) The busbars 50 and 60 are accommodated in a single case 40. This decreases the number of parts and the number of assembly processes compared to when, for example, the input busbars 50 and the output busbars 60 are accommodated in different cases.

The above embodiment may be modified as described below. The above embodiment and the following modifications can be combined as long as the combined modifications remain technically consistent with each other.

The high-voltage electric wire 70 does not have to extend out of the housing 11. Specifically, the high-voltage electric wire 70 does not have to include the high-voltage harness 72 that extends through the harness hole 14h out of the inverter case 14. Instead of the high-voltage electric wire 70, the motor-driven compressor 10 may include, for example, a cylindrical connector connecting portion that projects out of the inverter case 14. The external power supply 75 may be electrically connected to the corresponding input busbar 50 by connecting the external power supply 75 to the connector connecting portion.

The input busbars 50 may be insert-molded in the case 40 to form a module. In other words, the gap 55 does not have to be formed between the inner surface of the case 40 and each input busbar 50. That is, the input busbars 50 do not have to be allowed to move in the case 40 when the circuit board 31 vibrates.

The output busbars 60 may be insert-molded in the case 40 to form a module. In other words, the gap 65 does not have to be formed between the inner surface of the case 40 and each output busbar 60. That is, the output busbars 60 do not have to be allowed to move in the case 40 when the circuit board 31 vibrates.

The input busbars 50 and the output busbars 60 may be accommodated and held in different cases.

The motor-driven compressor 10 does not have to include the projections 56 and 57.

The motor-driven compressor 10 does not have to include the projections 66 and 67.

The motor-driven compressor 10 does not have to include the projections 56, 57, 66, and 67.

Each input busbar accommodation recess 42 may have any shape as long as the corresponding input busbar 50 can be accommodated.

Each output busbar accommodation recess 45 may have any shape as long as the corresponding output busbar 60 can be accommodated.

Each busbar coupling portion 52 may be formed integrally with the corresponding lead wire 53 in advance instead of being joined with the lead wire 53 by welding.

Each busbar coupling portion 62 may be formed integrally with the corresponding lead wire 63 in advance instead of being joined with the lead wire 53 by welding.

A cover that includes a peripheral wall and an end wall may be attached to the end wall 13a, and the end wall 13a and the cover may define the inverter accommodation chamber 14a. In this case, for example, the connector 35 is coupled to the inverter case 14 and sandwiched between the end wall 13a and the cover.

The motor controller 30 may be disposed in the housing 11 radially outward from the rotation shaft 15. In other words, the compression unit 16, the electric motor 17, and the motor controller 30 do not have to be arranged next to one another in order along the axis of the rotation shaft 15.

The compression unit 16 does not have to be a scroll type, and may be, for example, a piston type or a vane type.

The motor-driven compressor 10 is not limited to use with the vehicle air conditioner 23. For example, the motor-driven compressor 10 may be installed in a fuel cell vehicle and configured to compress air, which is the fluid supplied to a fuel cell, with the compression unit 16.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:
1. A motor-driven compressor, comprising:
a compression unit configured to compress a fluid;
an electric motor configured to drive the compression unit;
a motor controller including a circuit board and configured to drive the electric motor;
a housing including an inverter accommodation chamber, wherein the inverter accommodation chamber accommodates the motor controller; and
a connector accommodated in the inverter accommodation chamber and electrically connecting the circuit board and a member located outside the inverter accommodation chamber, wherein
the connector includes
one or more busbars electrically connected to the circuit board, and a case formed from a resin and accommodating the one or more busbars, the circuit board and the case are fastened to the housing, and the one or more busbars are allowed to move in the case when the circuit board vibrates.

2. The motor-driven compressor according to claim 1, wherein the one or more busbars include an input busbar that electrically connects an external power supply and the circuit board, and a high-voltage electric wire extends out of the housing, the high-voltage electric wire including a first end electrically connected to the input busbar and a second end electrically connected to the external power supply.

3. The motor-driven compressor according to claim 1, further comprising a conductive member extending through the housing and electrically connecting the electric motor and the motor controller, wherein the one or more busbars include an output busbar that electrically connects the conductive member and the circuit board.

4. The motor-driven compressor according to claim 1, wherein the case includes a restrictor that restricts movement of the one or more busbars relative to the case in a direction intersecting a thickness-wise direction of the circuit board.

5. The motor-driven compressor according to claim 1, wherein the motor controller and the electric motor are arranged next to each other along a rotation axis of the electric motor, and the electric motor, the case, and the circuit board are arranged next to one another in order along the rotation axis.

6. The motor-driven compressor according to claim 5, wherein each of the one or more busbars includes a connection terminal electrically connected to the member located outside the inverter accommodation chamber, a busbar coupling portion extending from the connection terminal in a direction intersecting the rotation axis, and a lead wire, wherein the lead wire includes an extension portion extending from the busbar coupling portion in a direction intersecting the rotation axis, a bend portion bent relative to the extension portion, and a projection portion projecting out of the case and including a distal end connected to the circuit board, and the connection terminal, the busbar coupling portion, and the lead wire are spaced apart from an inner surface of the case in a direction extending along the rotation axis and allowed to move in the case along the rotation axis.

7. The motor-driven compressor according to claim 1, wherein the case holds an electronic component.

8. The motor-driven compressor according to claim 1, wherein the one or more busbars include busbars, and the case includes accommodation recesses respectively accommodating the busbars, and covers respectively closing openings of the accommodation recesses.

9. The motor-driven compressor according to claim 8, wherein each of the accommodation recesses includes two projections projecting toward each other in a direction intersecting a thickness-wise direction of the circuit board, and each of the busbars is sandwiched by the two projections and spaced apart from an inner surface of the case in the thickness-wise direction of the circuit board.

* * * * *